US010527096B2

(12) United States Patent
Taniguchi et al.

(10) Patent No.: US 10,527,096 B2
(45) Date of Patent: Jan. 7, 2020

(54) ROLLING BEARING (71) Applicant: JTEKT CORPORATION, Osaka-shi, Osaka (JP)

(72) Inventors: Youzou Taniguchi, Toyota (JP); Takashi Iwata, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/380,714

(22) Filed: Dec. 15, 2016

(65) Prior Publication Data
US 2017/0184153 A1 Jun. 29, 2017

(30) Foreign Application Priority Data

Dec. 25, 2015 (JP) ................................. 2015-253232

(51) Int. Cl.
*F16C 33/38* (2006.01)
*F16C 33/41* (2006.01)
*F16C 19/06* (2006.01)

(52) U.S. Cl.
CPC ........ *F16C 33/3887* (2013.01); *F16C 33/414* (2013.01); *F16C 19/06* (2013.01); *F16C 2226/74* (2013.01)

(58) Field of Classification Search
CPC ........ F16C 33/38; F16C 33/41; F16C 33/412; F16C 33/416; F16C 33/418; F16C 19/06; F16C 2226/74
See application file for complete search history.

(56) References Cited

U.S. PATENT DOCUMENTS

| 5,539,844 A * | 7/1996 | Tazumi | F16C 33/416 384/531 |
| 5,981,448 A * | 11/1999 | Matsui | C10M 101/04 508/101 |
| 6,113,278 A * | 9/2000 | Ohira | F16C 33/44 384/527 |
| 6,682,224 B2 * | 1/2004 | Ooitsu | F16C 19/163 384/527 |

(Continued)

FOREIGN PATENT DOCUMENTS

| CN | 102119281 A | 7/2011 | |
| JP | 2003314557 A * | 11/2003 | ............ F16C 33/414 |

(Continued)

OTHER PUBLICATIONS

Machine Translation of JP 2003314557 dated Nov. 2003.*

(Continued)

*Primary Examiner* — Alan B Waits
(74) *Attorney, Agent, or Firm* — Oliff PLC (57) ABSTRACT

A rolling bearing includes an inner ring, an outer ring, a plurality of balls, and an annular cage that holds the balls at intervals in a circumferential direction. The cage has an annular portion on a first side in an axial direction, and a plurality of cage bars. Pockets that hold the respective balls are each formed between a pair of the cage bars adjacent to each other in the circumferential direction on a second side in the axial direction with respect to the annular portion. Each of the pockets has a pocket surface shaped along a cylindrical surface centered around a center line that is a virtual line extending in a bearing radial direction. A linear protrusion that is elongate in a direction parallel to the center line is provided at an axially-first-side bottom portion of the pocket surface.

10 Claims, 6 Drawing Sheets

(56) References Cited

U.S. PATENT DOCUMENTS

| | | | |
|---|---|---|---|
| 8,534,920 B2 * | 9/2013 | Aida | F16C 33/3875 384/470 |
| 8,944,693 B2 * | 2/2015 | Katsuno | F16C 33/3856 384/531 |
| 9,011,016 B2 * | 4/2015 | Adane | F16C 33/3887 384/531 |
| 2011/0069920 A1 * | 3/2011 | Aida | F16C 33/3875 384/572 |
| 2011/0142388 A1 | 6/2011 | Maejima et al. | |
| 2011/0299805 A1 * | 12/2011 | Damato | F16C 19/163 384/531 |
| 2013/0322802 A1 | 12/2013 | Maejima et al. | |

FOREIGN PATENT DOCUMENTS

| | | | | |
|---|---|---|---|---|
| JP | 2004060701 A | * | 2/2004 | F16C 33/416 |
| JP | 2004211880 A | * | 7/2004 | F16C 19/08 |
| JP | 2004263819 A | * | 9/2004 | F16C 19/166 |
| JP | 2004332906 A | * | 11/2004 | F16C 33/418 |
| JP | 2005069419 A | * | 3/2005 | F16C 33/78 |
| JP | 2007056930 A | * | 3/2007 | F16C 33/416 |
| JP | 4025975 B2 | * | 12/2007 | F16C 33/416 |
| JP | 2008057762 A | * | 3/2008 | F16C 33/3806 |
| JP | 2008164094 A | * | 7/2008 | F16C 33/3806 |
| JP | 4484013 B2 | * | 6/2010 | F16C 33/418 |
| JP | 2014-066346 A | | 4/2014 | |

OTHER PUBLICATIONS

Machine Translation of JP 2004060701 dated Feb. 2004.*
Machine Translation of JP-4484013 dated Jun. 2010 (Year: 2010).*
Machine Translation of JP 2007-056930 (Year: 2007).*
Jun. 24, 2019 Office Action issued in Chinese Application No. 201611206419.8.

* cited by examiner

FIG.1

(SECOND SIDE IN AXIAL DIRECTION)

(FIRST SIDE IN AXIAL DIRECTION)

ROLLING BEARING

INCORPORATION BY REFERENCE

The disclosure of Japanese Patent Application No. 2015-253232 filed on Dec. 25, 2015 including the specification, drawings and abstract, is incorporated herein by reference in its entirety.

BACKGROUND OF THE INVENTION

1. Field of the Invention

The invention relates to a rolling bearing.

2. Description of the Related Art

Many rolling bearings are used for various types of industrial equipment. A rolling bearing includes an inner ring, an outer ring, a plurality of rolling elements, and a cage. Among such rolling bearings, a ball bearing including balls as rolling elements offers particularly small rotational resistance. The rolling elements are interposed between the inner ring and the outer ring. The cage holds the rolling elements.

Figure 6:
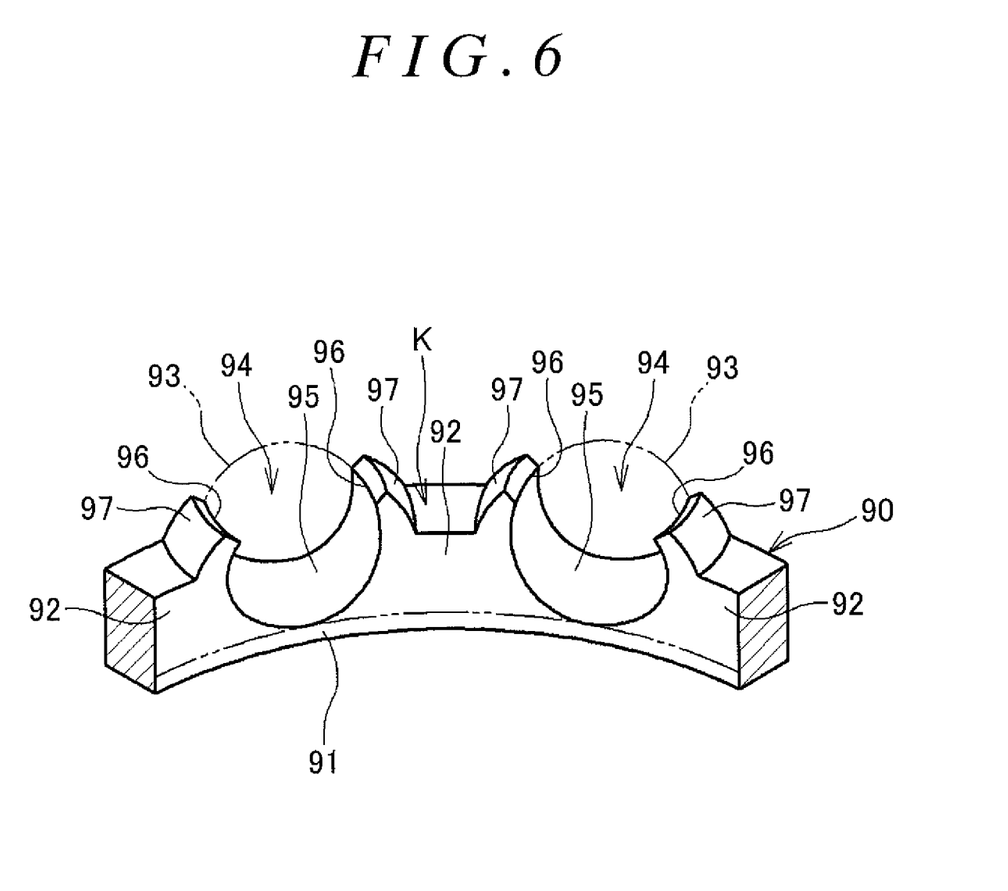
FIG. 6 is a perspective view depicting a part of a conventional snap cage.

As a cage that holds balls, what is called a snap cage is known (see, for example, Japanese Patent Application Publication No. 2014-66346 (JP 2014-66346 A). FIG. 6 is a perspective view depicting a part of a conventional snap cage 90. The snap cage 90 has an annular portion 91 and a plurality of cage bars 92. The cage bars 92 extend from the annular portion 91 in an axial direction. A pair of the cage bars 92, 92 adjacent to each other in a circumferential direction forms a pocket 94 that holds a ball 93.

As depicted in FIG. 6, each pocket 94 has a pocket surface 95 that can contact the corresponding ball 93. The conventional pocket surface 95 is shaped along a spherical surface having a slightly larger diameter than the ball 93. Thus, a contact area between the pocket surface 95 and the ball 93 is large, leading to significant friction (high friction torque) between the cage 90 and the ball 93. The ball bearing, including balls as rolling elements, offers relatively small rotational resistance, but has been desired to offer further reduced resistance to deliver enhanced rotational performance.

SUMMARY OF THE INVENTION

An object of the invention is to provide a rolling bearing that enables a reduction in friction between a cage and balls.

A rolling bearing in an aspect of the invention includes an inner ring, an outer ring, a plurality of balls provided between the inner ring and the outer ring, and an annular cage that holds the balls at intervals in a circumferential direction. The cage has an annular portion on a first side in an axial direction, and a plurality of cage bars extending from the annular portion toward a second side in the axial direction. Pockets that hold the respective balls are each formed between a pair of the cage bars adjacent to each other in the circumferential direction on the second side in the axial direction with respect to the annular portion. Each of the pockets has a pocket surface shaped along a cylindrical surface centered around a center line that is a virtual line extending in a bearing radial direction. A linear protrusion that is elongate in a direction parallel to the center line is provided at an axially-first-side bottom portion of the pocket surface. In the rolling bearing, each of the pockets of the cage has the pocket surface shaped along the cylindrical surface, and the linear protrusion is provided at the axially-first-side bottom portion of the pocket surface. Consequently, each of the balls is in point contact with the cage (pocket surface). In the rolling bearing of this aspect, the contact area between each ball and the cage is small, thus enabling a reduction in friction (friction torque) between the ball and the cage.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
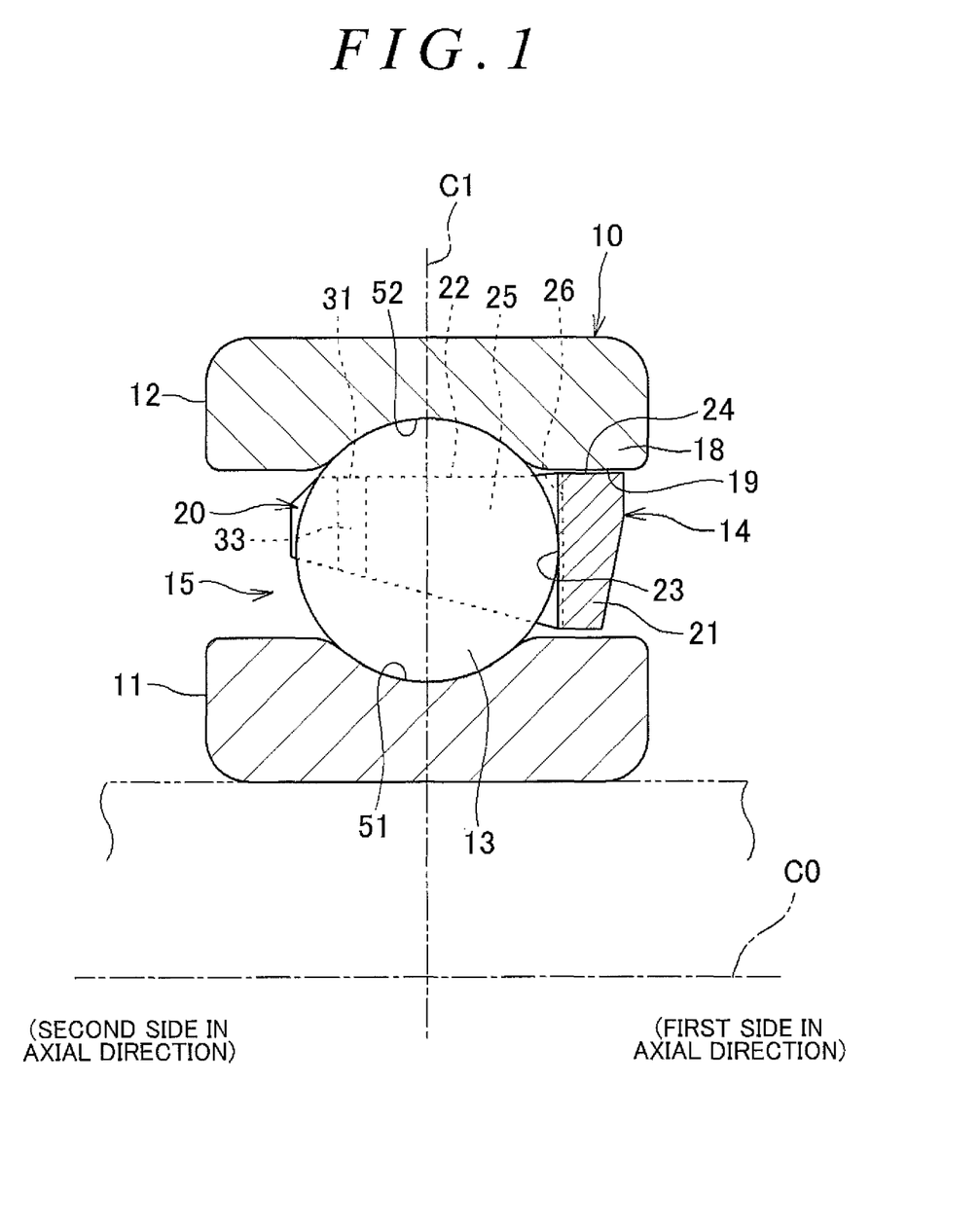
FIG. 1 is a sectional view depicting an embodiment of a rolling bearing in the invention.

An embodiment of the invention will be described based on the drawings. FIG. 1 is a sectional view depicting an embodiment of a rolling bearing in the invention. A rolling bearing 10 includes an inner ring 11, an outer ring 12, a plurality of balls (rolling elements) 13, and an annular cage 14. The balls 13 are provided between the inner ring 11 and the outer ring 12. The cage 14 holds the balls 13 at intervals in a circumferential direction. The rolling bearing 10 depicted in FIG. 1 is a deep groove ball bearing. The inner ring 11, the outer ring 12, and the balls 13 are formed of bearing steel or carbon steel. The cage 14 in the present embodiment is formed of resin and can be manufactured by injection molding using a mold. Since the cage 14 is formed of resin, a small linear protrusion 23 is easily formed on each pocket surface 25 described below.

The inner ring 11 is a cylindrical member and has a groove-like inner-ring raceway surface 51 formed on an outer peripheral surface of the inner ring 11 and along which the balls 13 roll. The outer ring 12 is a cylindrical member and has a groove-like outer-ring raceway surface 52 formed on an inner peripheral surface of the outer ring 12 and along which the balls 13 roll. The balls 13 are provided in an annular space 15 formed between the inner ring 11 and the outer ring 12. Rotation of the rolling bearing 10 (in the present embodiment, rotation of the inner ring 11) allows the balls 13 held by the cage 14 to roll on the inner-ring raceway surface 51 and the outer-ring raceway surface 52.

Figure 2:
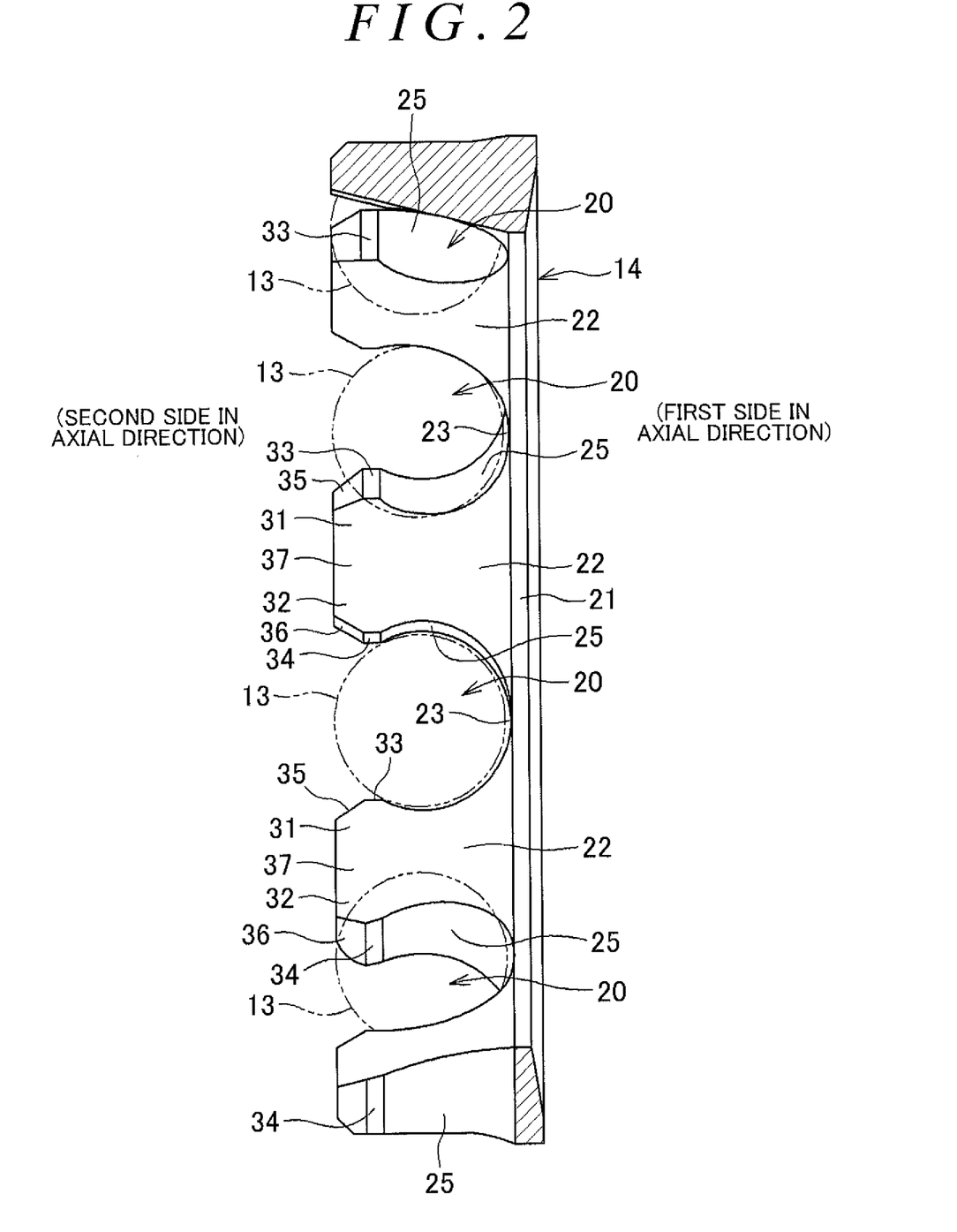
FIG. 2 is a diagram illustrating a cage cut into halves.
Figure 3:
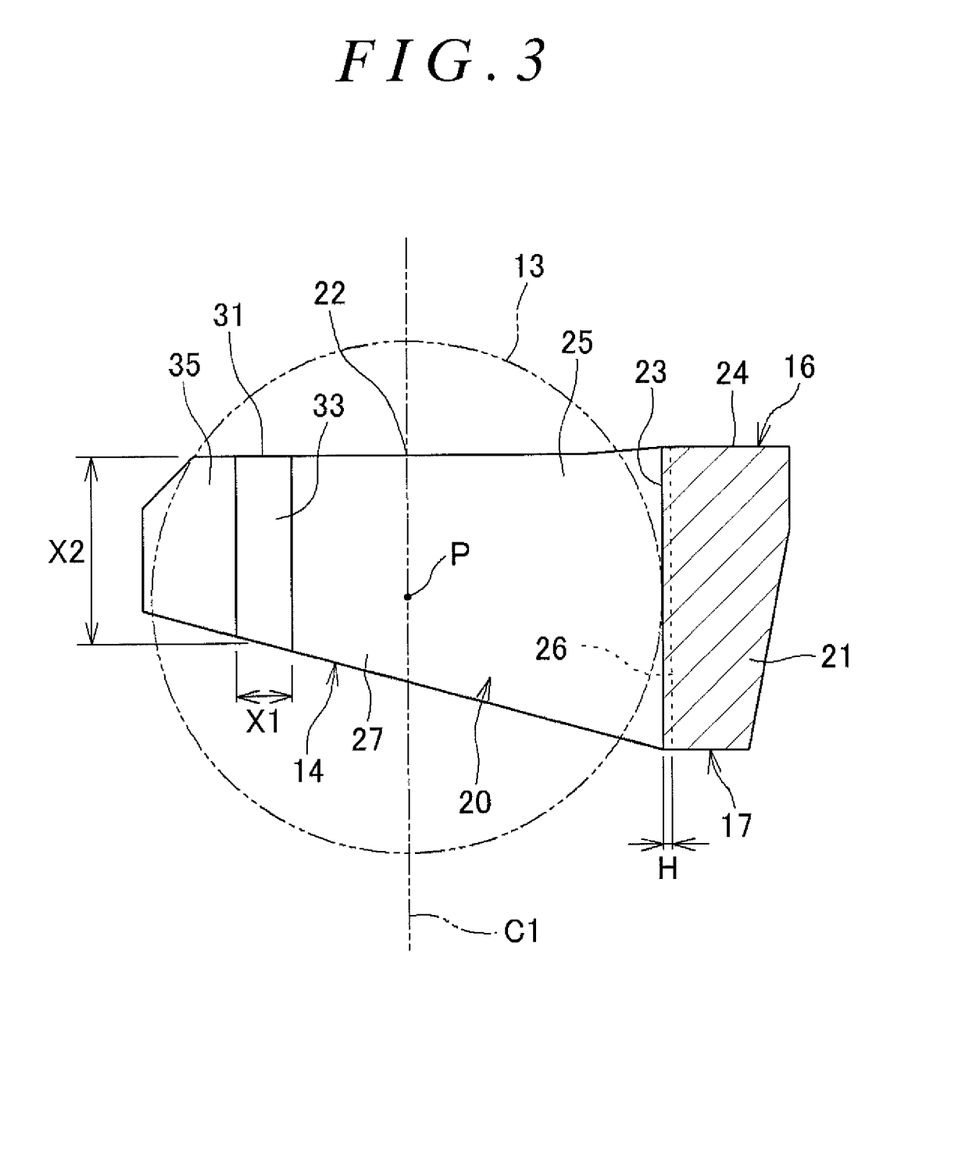
FIG. 3 is a diagram illustrating a pocket of the cage and a periphery of the pocket.
Figure 4:
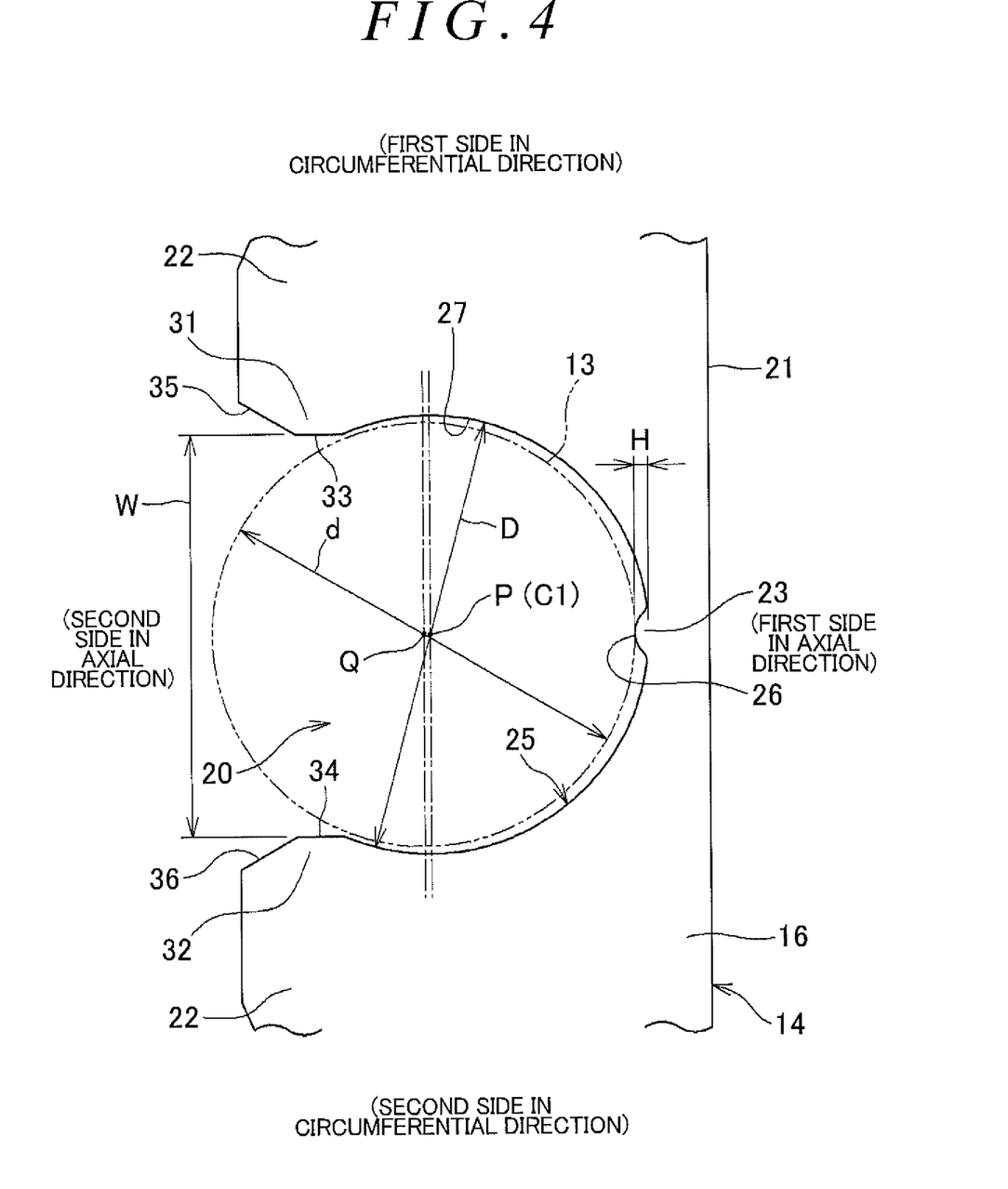
FIG. 4 is a diagram of the pocket and the periphery thereof as viewed from outside in a radial direction.

FIG. 2 is a diagram illustrating the cage 14 cut into halves. FIG. 3 is a diagram illustrating a pocket 20 of the cage 14 and a periphery of the pocket 20, FIG. 4 is a diagram of the pocket 20 and the periphery thereof as viewed from outside in a radial direction. The cage 14 can hold the balls 13 at predetermined (regular) intervals along the circumferential direction. Thus, a plurality of the pockets 20 is formed in the cage 14 along the circumferential direction to hold the respective balls 13. The cage 14 in the present embodiment is what is called a snap cage. The cage 14 has an annular portion 21 and a plurality of cage bars 22. The annular portion 21 is provided at a first side of the ball 13 in the axial direction (in FIG. 1 and FIG. 2, a right side). The cage bars 22 extend from the annular portion 21 toward a second side in the axial direction (in FIG. 1 and FIG. 2, a left side). Each of the pockets 20 is a space on the second side in the axial direction with respect to the annular portion 21 between a pair of the cage bars 22, 22 adjacent to each other in the circumferential direction.

In the present embodiment, the axial direction is parallel to a center line C0 (see FIG. 1) of the rolling bearing 10. The center line is referred to as the bearing center line C0. Center lines of the inner ring 11, the outer ring 12, and the cage 14 coincide with the bearing center line C0. A radial direction of the rolling bearing 10 is referred to as a bearing radial direction. In FIG. 1 and FIG. 3, a virtual line C1 depicted by a long dashed double-short dashed line is orthogonal to the bearing center line C0, and a direction along the virtual line C1 corresponds to the bearing radial direction.

As depicted in FIGS. 2 to 4, each of the pockets 20 of the cage 14 has a pocket surface 25 shaped along a virtual cylindrical surface. The cylindrical surface is a surface centered around a center line that is the virtual line C1 extending in the bearing radial direction. In other words, the center line of the cylindrical surface forming the pocket surface 25 coincides with the virtual line C1. The center line of the cylindrical surface may hereinafter be denoted as C1.

As depicted in FIG. 4, a diameter D of the cylindrical surface is slightly larger than a diameter d of each ball 13. Thus, a clearance is formed between the pocket surface 25 and the ball 13 to allow the cage 14 to be slightly displaced with respect to the ball 13. The ball 13 is a sphere, and can thus come into point contact with the pocket surface 25, shaped along the cylindrical surface, or a linear protrusion 23 described below and provided on the pocket surface 25.

As depicted in FIG. 1, an outer peripheral surface 24 of the annular portion 21 faces an inner peripheral surface 19 of a shoulder portion 18 of the outer ring 12 via a slight clearance. Thus, when the cage 14 is displaced in the radial direction, the outer peripheral surface 24 of the annular portion 21 can come into contact with the inner peripheral surface 19 of the shoulder portion 18. In other words, the cage 14 in the present embodiment is guided and positioned in the radial direction by the outer ring 12.

Figure 5:
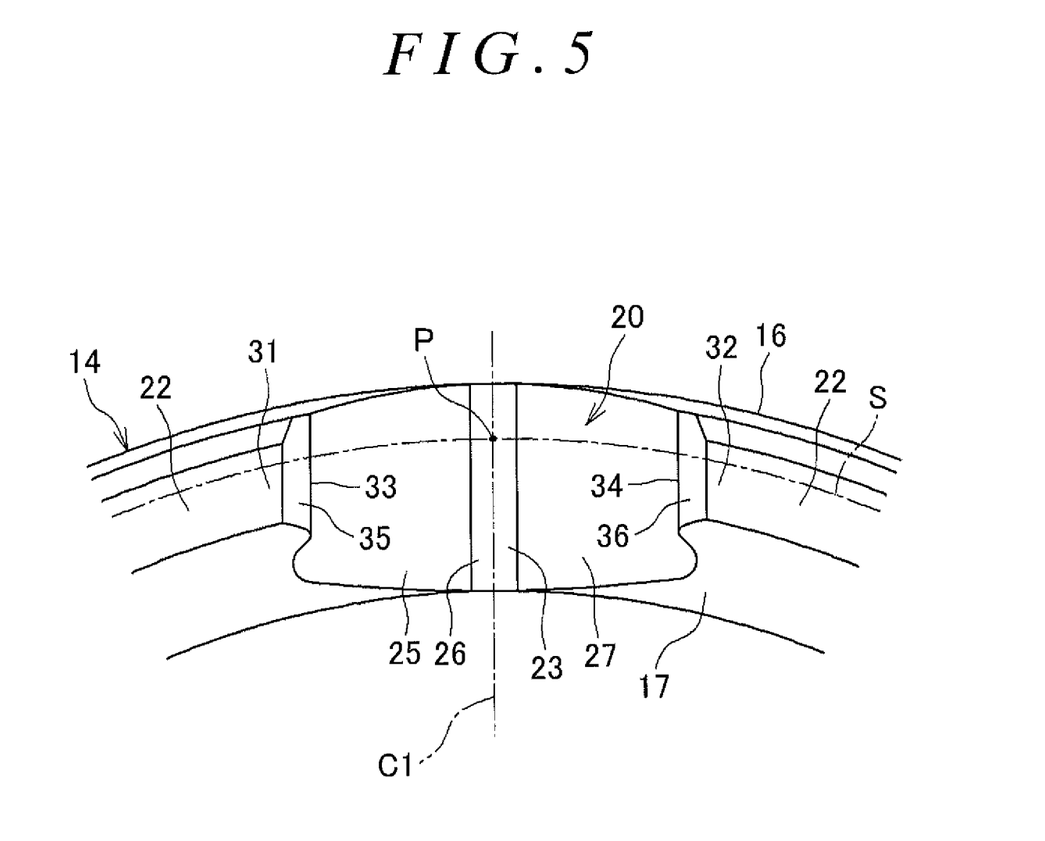
FIG. 5 is a diagram of the pocket and the periphery thereof as viewed from a second side in an axial direction.

FIG. 5 is a diagram of the pocket 20 and the periphery thereof as viewed from the second side in the axial direction. As depicted in FIG. 4 and FIG. 5, the pocket surface 25 is shaped along the cylindrical surface as described above. The linear protrusion 23 that protrudes toward a pocket center P is provided at an axially-first-side bottom portion 26 of the pocket surface 25. As depicted in FIG. 3 and FIG. 5, the linear protrusion 23 is a protrusion that is elongate in a direction parallel to the center line C1 and that extends continuously between an outer peripheral surface 16 and an inner peripheral surface 17 of the cage 14. The pocket center P is a point on the center line C1, and is, in particular, an intersecting point between the center line C1 and a pitch circle S (see FIG. 5) of the ball 13.

The linear protrusions 23 has a constant sectional shape along a longitudinal direction and is shaped like a protruding circular arc as depicted in FIG. 4. In other words, the linear protrusion 23 is shaped like a protruding circular arc in section as viewed in the radial direction. In the present embodiment, the entire area of the pocket surface 25 except for the linear protrusion 23 has an even smooth surface 27 along the cylindrical surface. The protruding height H (see FIG. 3 and FIG. 4) of the linear protrusion 23 is set larger than a difference (D/2−d/2) between the radius (D/2) of the pocket surface 25 and the radius (d/2) of the ball 13. The protruding height H is set smaller than the double of the difference (D/2−d/2).

In FIG. 4, the cage 14 has a pair of facing portions 31, 32 on the second side of the pocket 20 in the axial direction. The facing portions 31, 32 are located facing each other such that a distance W between the facing portions 31, 32 is smaller than the diameter D of the pocket surface 25, shaped along the cylindrical surface. The facing portion 31 on a first side in the circumferential direction has a straight surface 33 facing toward a second side in the circumferential direction. The facing portion 32 on the second side in the circumferential direction has a straight surface 34 facing toward the first side in the circumferential direction. The straight surface 33 on the first side and the straight surface 34 on the second side are located parallel and facing each other with the distance W between the straight surfaces 33 and 34. On a tip side (second side in the axial direction) of the cage bars 22, 22 adjacent to each other in the circumferential direction, the circumferential distance is smallest (narrowest) between the straight surfaces 33, 34.

In FIG. 1 and FIG. 3, the straight surface 33 is a flat surface that is wide in a first direction parallel to the bearing center line C0 and in a second direction orthogonal to the first direction. The straight surface 33 is quadrangular (trapezoidal). The straight surface 34 on the second side has the same shape as that of the straight surface 33 on the first side and is quadrangular (trapezoidal). In FIG. 3, a dimension in the first direction is denoted by X1, and a dimension in the second direction is denoted by X2. The dimension X1 is set larger than the protruding height H of the linear protrusion 23 and is preferably several (two) millimeters.

In the cage 14 in the present embodiment, the facing portions 31, 32 have the straight surfaces 33, 34, respectively, parallel to each other, as described above. The facing portions 31, 32 further have inclined surfaces 35, 36 on the second side in the axial direction with respect to the straight surfaces 33, 34, respectively, such that the distance between the inclined surfaces 35, 36 increases toward the second side in the axial direction. When the cage 14 is assembled to the balls, the cage 14 is guided via the inclined surfaces 35, 36 to facilitate assembly of the cage 14 (pockets 20) to the balls 13.

In the rolling bearing 10 in the present embodiment, each of the pockets 20 of the cage 14 has the pocket surface 25 shaped along the virtual cylindrical surface centered around the center line C1 that is the virtual line extending in the bearing radial direction, as described above. The linear protrusion 23, which is elongate in the direction parallel to the center line C1, is provided at the axially-first-side bottom portion 26 of the pocket surface 25. In this configuration, the balls 13 come into point contact with the respective pocket surfaces 25 of the cage 14. This decreases a contact area between each ball 13 and the cage 14, enabling a reduction in friction (friction torque) between the ball 13 and the cage 14. As a result, the rolling bearing 10 delivers enhanced rotational performance.

The following description is given, for example, with reference to FIG. 4. When the cage 14 is displaced toward the second side in the axial direction with respect to the balls 13, each of the linear protrusions 23 comes into point contact with the corresponding ball 13. As described above, the entire area of each pocket surface 25 except for the linear protrusion 23 has an even smooth surface 27 shaped along the cylindrical surface. Thus, when the cage 14 is displaced toward the first side in the axial direction with respect to the balls 13, each ball 13 comes into point contact with the corresponding pocket surface 25 (smooth surface 27). In particular, when displaced toward the first side in the axial direction, the cage 14 can come into point contact with each ball 13 at two areas of the cage 14 on the facing portion 31, 32 side of the pocket surface 25. When each ball 13 and the cage 14 are displaced relative to each other in the circumferential direction, the ball 13 comes into point contact with the cage 14 at an area of the pocket surface 25 on the first side or the second side in the circumferential direction. The linear protrusion 23 is formed to be elongate in the direction parallel to the center line C1 of the virtual cylindrical surface (see FIG. 3). Consequently, even when the cage 14 is displaced in the radial direction, the cage 14 and each ball 13 are kept in point contact with each other. As described above, in the rolling bearing 10 of the present embodiment, the contact area between each ball 13 and the cage 14 is small, thus enabling a reduction in the friction between the ball 13 and the cage 14.

Since the linear protrusion 23 is provided on each pocket surface 25, the axial clearance between the corresponding ball 13 and the pocket surface 25 can be kept small. This allows suppression of axial backlash of the cage 14 with respect to the balls 13, enabling the cage 14 to be stably rotated.

Rotation of the rolling bearing 10 makes the center Q (see FIG. 4) of each ball 13 misaligned with the center P of the corresponding pocket 20 in the circumferential direction. In the present embodiment, the linear protrusion 23 is shaped like a protruding circular arc in section as viewed in the radial direction, as described above. Thus, in spite of possible misalignment between the center Q of the ball 13 and the center P of the pocket 20, the ball 13 and the linear protrusion 23 can come into point contact with each other.

In the cage 14, each pocket 20 is shaped to be open toward the second side in the axial direction. The linear protrusion 23 is provided at the axially-first-side bottom portion 26 of each pocket surface 25. Thus, the ball 13 is arranged so as to be slightly biased toward the opening side (the second side in the axial direction) of the pocket 20. In other words, the protruding height H of the linear protrusion 23 is set larger than the difference (D/2−d/2) between the radius (D/2) of the pocket surface 25 and the radius (d/2) of the ball 13 as described above. Consequently, contact of the ball 13 with the linear protrusion 23 prevents the center P of the pocket 20 from coinciding with the center Q of the ball 13.

Compared to a configuration with no linear protrusions 23, the configuration in the present embodiment is likely to cause a motion in which the pockets 20 act to come off from the respective balls 13. However, in the present embodiment, the cage 14 has the pair of the facing portions 31, 32 located on the second side of the pockets 20 in the axial direction so as to face each other in the circumferential direction such that the distance W between the facing portions 31, 32 is smaller than the diameter D of the pocket surface 25, as described above. The facing portions 31, 32 have the straight surfaces 33, 34, respectively, which are parallel to each other. Thus, even when a motion is likely to occur in which the pockets 20 act to come off from the respective balls 13 and the motion causes the facing portions 31, 32 to act to pass over the balls 13, the facing portions 31, 32 have difficulty passing over the balls 13 because the facing portions 31, 32 have the straight surfaces 33, 34, which are parallel to each other. This allows the balls 13 and the pockets 20 to be restrained from completely coming off from one another. Consequently, the cage 14 can be restrained from coming off from the balls 13.

In a conventional snap cage 90 depicted in FIG. 6, edges 96 of a pocket surface 95 on an opening side of a pocket 94 correspond to portions on the tip side of cage bars 92, 92 adjacent to each other in the circumferential direction where the circumferential distance between the cage bars 92, 92 is shortest. In the conventional configuration, the edges 96 have rectangular shapes. Thus, when a motion occurs in which the pockets 94 act to come off from the respective balls 93 and the motion causes the edges 96 to even slightly climb over the corresponding ball 93 (the largest portion of the ball 93), the balls 93 and the pockets 94 easily come off from one another. In contrast, in the configuration in the above-described embodiment, the straight surfaces 33, 34 of the facing portions 31, 32 on the opening side of the pocket 20 correspond to a position on the tip side of the cage bars 22, 22 adjacent to each other in the circumferential direction where the circumferential distance between the cage bars 22, 22 is shortest. Each of the straight surfaces 33, 34 has the predetermined dimension X1 (see FIG. 3) in the axial direction. Thus, even when a motion occurs in which the pockets 20 act to come off from the respective balls 13 and those portions of the tips of the cage bars 22, 22 at which the circumferential distance between the cage bars 22, 22 is shortest (the portions are referred to as a the smallest portions) act to climb over the corresponding ball 13, the smallest portions have difficulty completely climbing over the largest portion of the ball 13 due to the presence of the straight surfaces 33, 34 with the dimension X1 in the direction in which the smallest portions act to climb over the largest portion. Therefore, the balls 13 and the pockets 20 can be restrained from coming off from one another.

In the conventional snap cage 90 depicted in FIG. 6, a pair of pawl portions 97, 97 are provided at the tips of the respective cage bars 92, and a space K is formed between the pawl portions 97, 97. In contrast, as depicted in FIG. 2, the pawl portions 97 and the space K between the pawl portions 97, 97, which are provided in the conventional snap cage 90, are omitted from each cage bar 22 in the present embodiment. Each cage bar 22 in the present embodiment includes the facing portions 31, 32 as a part of the cage bar 22 and has a solid portion 37 on the second side in the axial direction. The solid portion 37 has a function to hinder circumferential deformation of the facing portions 31, 32 of each cage bar 22. The solid portion 37 is a portion between the facing portions 31, 32. The solid portion 37 and the facing portions 31, 32 are integrated together as parts of the cage bar 22. In other words, the second side of the cage bar 22 in the axial direction in the present embodiment has a solid structure. Consequently, with the cage 14 holding the balls 13 in the respective pockets 20, the facing portions 31, 32 are difficult to deform so as to spread in the circumferential direction. As a result, the balls 13 and the pockets 20 can be more effectively restrained from coming off from one another.

The linear protrusion 23 formed on each pocket surface 25 allows an area precluded from being contacted by the ball 13 to be formed on the opposite sides of the linear protrusion 23. Lubricant (grease) can be stored in these areas so that the stored lubricant (grease) can be gradually used for lubrication.

The embodiment disclosed above is illustrative in every way and is not restrictive. In other words, the rolling bearing in the invention is not limited to the illustrated embodiment but may be in any other embodiment within the scope of the invention. In the above-described embodiment, the rolling bearing 10 has been described in which the cage 14 is guided and positioned in the radial direction by the outer ring 12.

However, a rolling bearing may be provided in which the cage 14 is guided by the inner ring 11 such that the inner peripheral surface of the annular portion 21 can contact the shoulder portion of the inner ring 11. Also in this case, the linear protrusion or the like is provided on each pocket surface shaped along the cylindrical surface.

In the invention, the contact area between each ball and the cage is decreased, enabling a reduction in the friction between the ball and the cage. As a result, the rotational performance of the rolling bearing can be enhanced.

What is claimed is:

1. A rolling bearing comprising:
an inner ring;
an outer ring;
a plurality of balls provided between an inner ring raceway surface of the inner ring and an outer ring raceway surface of the outer ring; and
an annular cage that holds the balls at intervals in a circumferential direction, wherein:
the cage has an annular portion on a first axial side in an axial direction, and a plurality of cage bars extending from the annular portion toward a second axial side in the axial direction, and pockets that hold the respective balls are each formed between a pair of the cage bars adjacent to each other in the circumferential direction on the second axial side in the axial direction with respect to the annular portion, each of the cage bars being disposed directly between two of the balls in the circumferential direction,
each of the pockets has a pocket surface shaped along a cylindrical surface centered around a center line that is a virtual line extending in a bearing radial direction,
each of the cage bars comprises:
a second axial side surface formed on the second axial side of the cage, the second axial side surface being parallel to a virtual plane that is defined by the virtual line extending in the bearing radial direction, and a virtual circle formed in the circumferential direction so as to extend through a center of each of the pockets,
a radially inner peripheral surface facing the inner ring, the radially inner peripheral surface extending in a direction from the first axial side to the second axial side so as to be inclined in a direction from an inner side towards an outer side of the rolling bearing in the bearing radial direction,
a radially outer peripheral surface facing the outer ring, and
a first inclined surface connecting the second axial side surface and the radially outer peripheral surface, the first inclined surface extending in a direction from the first axial side to the second axial side so as to be inclined in a direction from the outer side to the inner side of the rolling bearing in the bearing radial direction,
a first distance from the radially outer peripheral surface of each of the cage bars to the virtual circle is longer than a second distance from the radially inner peripheral surface of each of the cage bars to the virtual circle,
the cage has a pair of facing portions located on the second axial side of each of the pockets, the pair of facing portions facing each other in the circumferential direction such that a distance between the pair of facing portions is smaller than a diameter of the pocket surface shaped along the cylindrical surface,
the outer ring has two shoulders respectively disposed on a first axial side and a second axial side of the outer ring raceway surface, and
the cage includes:
a pair of opposed portions located on the second axial side of the pair of cage bars forming each of the pockets,
second inclined surfaces located on the second axial side of the pair of opposed portions and inclined away from each other in a direction toward the second axial side, the second inclined surface being coupled to the second axial side surface, and
the first inclined surface of each cage bar is positioned so as to axially overlap the second inclined surfaces.

2. The rolling bearing according to claim 1, further comprising:
a liner protrusion that is elongate in a direction parallel to the center line and is provided at an axially-first-side bottom portion of the pocket surface.

3. The rolling bearing according to claim 2, wherein the linear protrusion is shaped as a protruding circular arc in section as viewed in the radial direction.

4. The rolling bearing according to claim 3, wherein the entire area of the pocket surface except for the linear protrusion has a smooth surface along the cylindrical surface.

5. The rolling bearing according to claim 2, wherein the entire area of the pocket surface except for the linear protrusion has a smooth surface along the cylindrical surface.

6. The rolling bearing according to claim 2, wherein the facing portions have respective straight surfaces that are parallel to each other.

7. The rolling bearing according to claim 6, wherein the linear protrusion is shaped like a protruding circular arc in section as viewed in the radial direction.

8. The rolling bearing according to claim 7, wherein the entire area of the pocket surface except for the linear protrusion has a smooth surface along the cylindrical surface.

9. The rolling bearing according to claim 6, wherein the entire area of the pocket surface except for the linear protrusion has a smooth surface along the cylindrical surface.

10. The rolling bearing according to claim 1, wherein the facing portions have respective straight surfaces that are parallel to each other.

* * * * *